United States Patent [19]

Rimmrott

[11] 4,021,702

[45] May 3, 1977

[54] ARRANGEMENT FOR DETECTING DEFICIENT OPERATIONAL CAPABILITY OF VACUUM SWITCHING VESSELS

[75] Inventor: Manfred Rimmrott, Berlin, Germany

[73] Assignee: Siemens Aktiengesellschaft, Munich, Germany

[22] Filed: June 5, 1975

[21] Appl. No.: 584,007

Related U.S. Application Data

[63] Continuation-in-part of Ser. No. 564,378, April 2, 1975, abandoned.

[30] Foreign Application Priority Data

Apr. 2, 1974 Germany .......................... 2416324

[52] U.S. Cl. .............................. 361/103; 340/248 R
[51] Int. Cl.² ........................................ H02H 5/04
[58] Field of Search ................... 317/40 R, 41, 42; 340/227 R, 228 R, 228 S, 248 R, 248 E; 250/338, 341, 352

[56] References Cited

UNITED STATES PATENTS

| | | | |
|---|---|---|---|
| 2,530,935 | 11/1950 | Bock | 317/40 R X |
| 3,364,066 | 1/1968 | Karlson et al. | 250/338 X |
| 3,499,153 | 3/1970 | Stanfill | 250/338 X |

*Primary Examiner*—Harry Moose
*Attorney, Agent, or Firm*—Kenyon & Kenyon Reilly Carr & Chapin

[57] ABSTRACT

The invention is directed to an arrangement which serves to detect deficient operational capability of vacuum switching vessels and which causes a signal to be given if a fault affecting the operability occurs. Instead of the signal, a protective device alone or together with the signal can also be caused to respond. According to the arrangement of the invention, the electromagnetic radiation emanating from the vacuum switching vessel is gathered by means of a detector and evaluated for providing the signal or initiating the action of the protective device. The range of the electromagnetic radiation in the region of thermal radiation is especially suitable for use. The invention is suited particularly for application in switchgear equipped with vacuum switching vessels.

5 Claims, 4 Drawing Figures

4,021,702

ARRANGEMENT FOR DETECTING DEFICIENT OPERATIONAL CAPABILITY OF VACUUM SWITCHING VESSELS

RELATED APPLICATIONS

This application is a continuation-in-part of my application Ser. No. 564,378 filed in the U.S. Pat. Office on Apr. 2, 1975, now abandoned, which is based on application number P 24 16 324.4, filed on Apr. 2, 1974 in the Federal Republic of Germany.

BACKGROUND OF THE INVENTION

It has been known to detect the deficiency of operational capability of vacuum switching vessels which can be caused, for instance, by a leak and the poorer vacuum resulting therefrom by utilizing the fact that there is an exceptionally large amount of heat which is developed when the contacts of such a defective vessel are opened; this heat is used for release purposes. In this connection, devices in the fashion of fusible link triggers, propellant charges and similar means have been described which are in thermally-conducting contact with a part of the vacuum switching vessel having a relatively small temperature time constant. In an arrangement of this kind, devices or apparatus are therefore attached directly to the vacuum switching vessels.

The instant invention is likewise concerned with an arrangement for detecting deficient operational capability of vacuum switching vessels which causes a signal to be given and/or a protective device to respond if a fault occurs.

It is an object of the invention to detect deficient operation without making contact and to therefore make it unnecessary to make changes in the vacuum switching vessels.

SUMMARY OF THE INVENTION

The arrangement according to the invention utilizes the electromagnetic radiation emanating from the vacuum switching vessel; this radiation is detected by means of a detector and is evaluated. This can involve primary radiation, for example, the infrared radiation emanating from the excessively hot switching vessel. For the purposes of the invention, however, the secondary radiation of the switching vessel is also suited, that is, the radiation which is reflected from the surface of the switching vessel and emanates from a separate radiation source. For this purpose, a body whose reflectivity for electromagnetic radiation is subject to a temperature-caused change can be connected with a part of the vacuum switching vessel, this body being inserted into the ray path between a radiation source and a radiation receiver.

For evaluating the heat radiation, it is advisable to construct the region of the vacuum switching vessel covered by the detector so that high emissivity is obtained. This can be achieved through the nature of the surface.

Although the invention is illustrated and described herein as an arrangement for detecting deficient operational capability of vacuum switching vessels, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
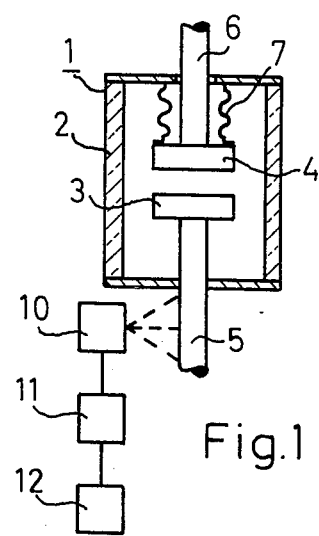
FIG. 1 is a schematic diagram of the detection arrangement according to the invention wherein the infrared radiation of the vessel is evaluated.

The vacuum switching vessel 1 in FIG. 1 has a housing 2 wherein a stationary contact 3 and a movable contact 4 are arranged. The stationary contact 3 is supported by a stationary connecting post 5 which protrudes from the housing 2 and can be fastened in a suitable manner in a clamping device. The movable contact 4 can be switched on and off by means of the movable connecting post 6, spring bellows 7 forming a resilient, vacuum-tight connection between the movable contact 4 and the housing 2. The other parts of the switching apparatus, such as the housing, the actuator, and terminals are omitted as they are not necessary for an understanding of the invention.

If for any reason the vacuum in the housing 2 has become so poor that an arc drawn when the contacts 3 and 4 separate is not properly extinguished, the large amount of heat produced thereby goes at first mainly into the contacts and the respective connecting posts 5 and 6 connected therewith. The infrared radiation emanating from the connecting post 5 is detected by a detector 10 and converted into an electrical signal which is fed through a signal amplifier 11 to a protective device 12. The detector 10 thus constitutes detector and transducer means for receiving the radiation and evaluating the same for thereby, in turn, providing a signal indicative of a deficient operation of the vacuum switching vessel.

Figure 2:
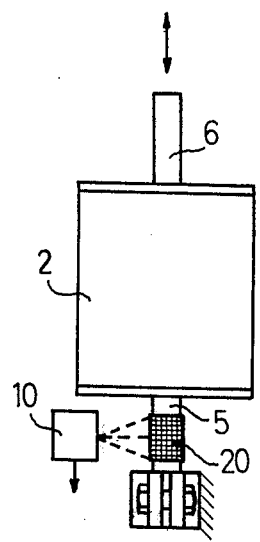
FIG. 2 shows how the heat radiation of the connecting post of the vacuum switching vessel can be increased.

It may be possible to choose simpler constructions for the detector 10 and the signal amplifier 11 if provision is made for stronger heat radiation through high emissivity of the connecting post 5. For this purpose, the connecting post 5 may be coated, for instance, with a dark paint 20 which leaves only the clamping area in the terminal of the switching apparatus bare as shown in FIG. 2.

Figure 3:
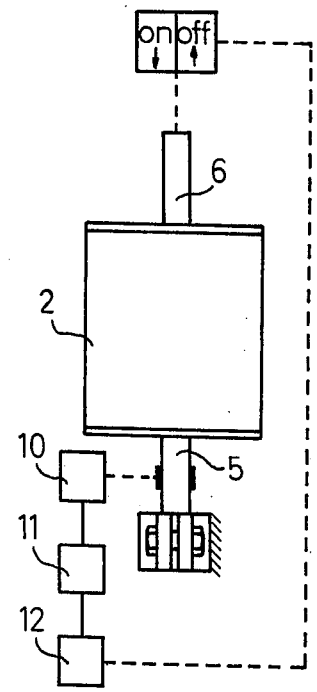
FIG. 3 illustrates schematically how the protective device can be configured to disconnect the vacuum switching vessel in response to a deficient operation of the vessel.

The protective device 12 can trigger, for instance, an optical or acoustic alarm, or it can cause the circuit to be disconnected immediately in which the vacuum switching vessel 1 is connected. For example, as shown in FIG. 3, the protective device 12 can be configured to disconnect the vacuum switching vessel in the event of a deficient operation of the vessel. FIG. 3 shows a functional connection between the protective device 12 and a drive apparatus which acts upon the movable connecting post 6 of the vacuum switching vessel 1 to move the movable post to disconnect the switch 1.

If the vacuum switching vessel 1 is part of a three-phase contactor, this contactor itself can also be made to switch off since three-phase loads are thereby separated from the network. This method leads to disconnection in most cases, as it is not likely that there is more than one defective switching vessel in the contactor.

There is considerable latitude in the arrangement of the detector 10 and the units 11 and 12, as it is merely necessary to arrange the detector 10 within the radiation range of the vacuum switching vessel 1. No constructive changes are therefore necessary in the vessel 1. The detector-transducer of the type suitable for use in the arrangement according to FIG. 1 can be, for example, a thermoelement of the type described and disclosed in U.S. Pat. No. 3,090,207.

Figure 4:
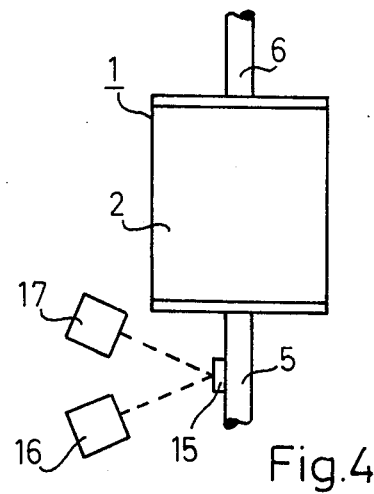
FIG. 4 shows a schematic diagram of the detection arrangement according to another embodiment of the invention wherein a separate radiation source is provided.

In FIG. 4, there is attached to the stationary connecting post 5 of the vacuum switching vessel 1 a body 15, whose reflectivity for the electromagnetic radiation, for example, light, emanating from the radiator 16 changes at an excessively high temperature. This may be accomplished, for instance, by the provision that the body 15 changes its color or the nature of its surface.

Suitable for this purpose, for instance, are paints which are used in electric switching installations for the temperature monitoring of installation parts and which are available for different response temperatures. Paints which change their color in response to temperature increases are described for example in the referenced text entitled: *Hochspannungsanlagen* by Weickert, page 334.

In addition, layers of plastic can be used, whose surface is initially shiny and becomes dull at elevated temperature.

The radiation receiver 17 in FIG. 4 may be followed, as in the embodiment according to FIG. 1 by an amplifier and a protective device.

What is claimed is:

1. An arrangement for detecting deficient operational capability in a vacuum switching vessel having movable and fixed contacts comprising: radiation means for providing electromagnetic radiation indicative of a deficient operation of the switching vessel; and, detection and transducer means for receiving said electromagnetic radiation and evaluating the same for thereby, in turn, providing a signal indicative of said deficient operation.

2. The arrangement of claim 1, said radiation means being defined by a part of the vacuum switching vessel wherein heat is developed in the event of deficient switching vessel operation, said radiation being produced by said heat.

3. The arrangement of claim 2 comprising interruption means responsive to said signal for disconnecting the vacuum switching vessel.

4. The arrangement of claim 3 wherein all but a small portion of said part of the vacuum switching vessel defining said radiation means is coated with a dark substance whereby a greater radiation capacity is obtained.

5. The arrangement of claim 1 wherein the vacuum switching vessel includes a part wherein heat develops in the event of a deficient vacuum switching vessel operation, said radiation means comprising: a body having a reflectivity for electromagnetic radiation which changes in response to a change in temperature, said body being mounted in heat-conducting contact with said part; and, a source of radiation for providing a beam of radiation, said body being disposed in the path between said source and said detection and transducer means.

* * * * *